(12) United States Patent
Sasaki et al.

(10) Patent No.: US 7,684,466 B2
(45) Date of Patent: Mar. 23, 2010

(54) WIRED SPREAD SPECTRUM COMMUNICATION DEVICE, A METHOD FOR COMMUNICATION THEREOF, AND A WIRED SPREAD SPECTRUM COMMUNICATION SYSTEM

(75) Inventors: Shigenobu Sasaki, Niigata (JP); Mitsusato Kawashima, Ogaki (JP)

(73) Assignee: Ibiden Industries Co., Ltd., Gifu-Ken (JP)

(*) Notice: Subject to any disclaimer, the term of this patent is extended or adjusted under 35 U.S.C. 154(b) by 966 days.

(21) Appl. No.: 10/376,801

(22) Filed: Feb. 28, 2003

(65) Prior Publication Data
US 2003/0169805 A1 Sep. 11, 2003

(30) Foreign Application Priority Data
Mar. 8, 2002 (JP) .............................. 2002-062890

(51) Int. Cl.
*H04B 1/00* (2006.01)
(52) U.S. Cl. ..................... 375/146; 375/130; 375/135; 375/136; 375/142; 375/144; 375/147; 375/149; 375/150; 375/219; 375/256; 375/295; 375/306; 375/340; 375/349; 375/351; 375/364; 375/365
(58) Field of Classification Search ................. 375/200, 375/201, 205–206, 130, 133, 141, 142, 145–147, 375/148, 295, 135–136, 145–17, 149–150, 375/219, 256, 306–307, 316, 340, 349, 351; 370/13, 17–18, 320, 335, 441, 431, 208–209, 370/350, 341, 503, 514, 329, 479, 342; 455/442, 455/522, 132, 436, 561
See application file for complete search history.

(56) References Cited

U.S. PATENT DOCUMENTS

| | | | | |
|---|---|---|---|---|
| 5,469,470 A | * | 11/1995 | Takahashi | 375/142 |
| 5,559,828 A | * | 9/1996 | Armstrong et al. | 375/130 |
| 5,717,713 A | * | 2/1998 | Natali | 375/149 |
| 6,091,781 A | * | 7/2000 | Mujtaba | 375/279 |
| 6,359,868 B1 | * | 3/2002 | Chen et al. | 370/335 |
| 6,381,233 B1 | * | 4/2002 | Sunaga | 370/335 |
| 6,430,171 B1 | * | 8/2002 | Ogami et al. | 370/342 |
| 6,456,607 B2 | * | 9/2002 | Arai et al. | 370/335 |
| 6,574,205 B1 | * | 6/2003 | Sato | 370/335 |
| 6,738,414 B2 | * | 5/2004 | Emery et al. | 375/147 |
| 7,161,895 B1 | * | 1/2007 | Sudo | 370/204 |
| 2003/0031196 A1 | * | 2/2003 | Nishimura | 370/441 |

FOREIGN PATENT DOCUMENTS

| | | |
|---|---|---|
| JP | 61-093745 | 5/1986 |
| JP | 2001-144653 | 5/2001 |

\* cited by examiner

*Primary Examiner*—Mohammad H Ghayour
*Assistant Examiner*—Sophia Vlahos
(74) *Attorney, Agent, or Firm*—Lucas & Mercanti, LLP

(57) ABSTRACT

A wired spread spectrum communication device, a method for communication thereof and a wired spread spectrum communication system capable of enabling easy establishment of synchronism are disclosed. In a transmitter unit of the wired spread spectrum communication device, a spreading code generator generates spread spectrum signals that are based on specified spreading codes, a strobe signal generator and a timing gate output the spread spectrum signals as sync signals at specified timings, and an adder superposes the sync signals to the spread information signals, while the adder further sends the information signals that have been superposed with the sync signals as transmitting signals to transmission paths.

4 Claims, 7 Drawing Sheets

Fig. 1
(A)
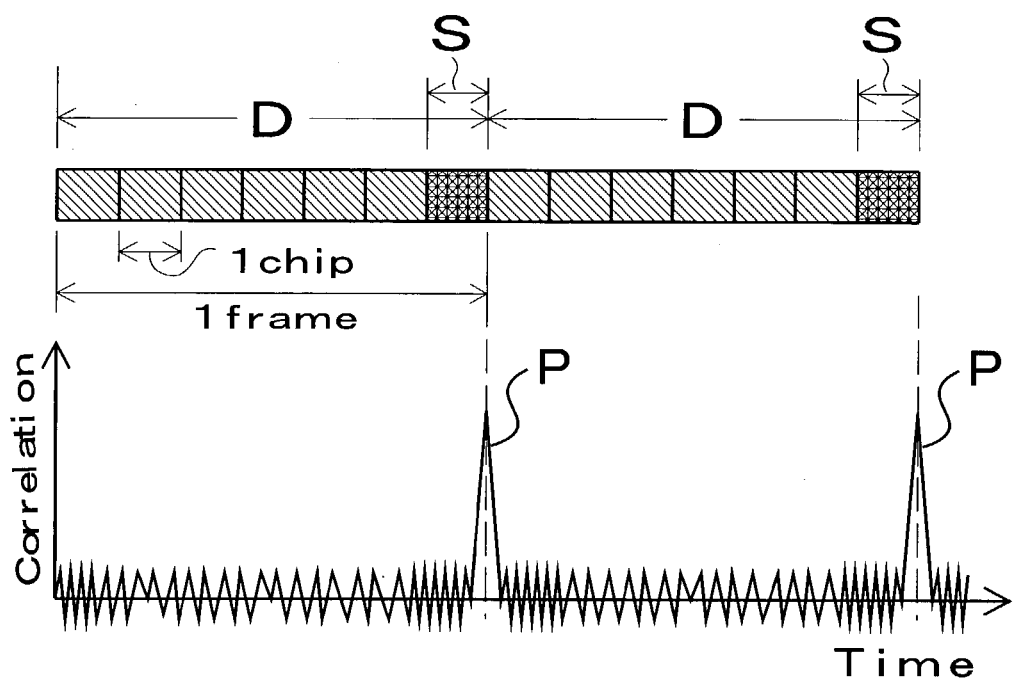
(B)
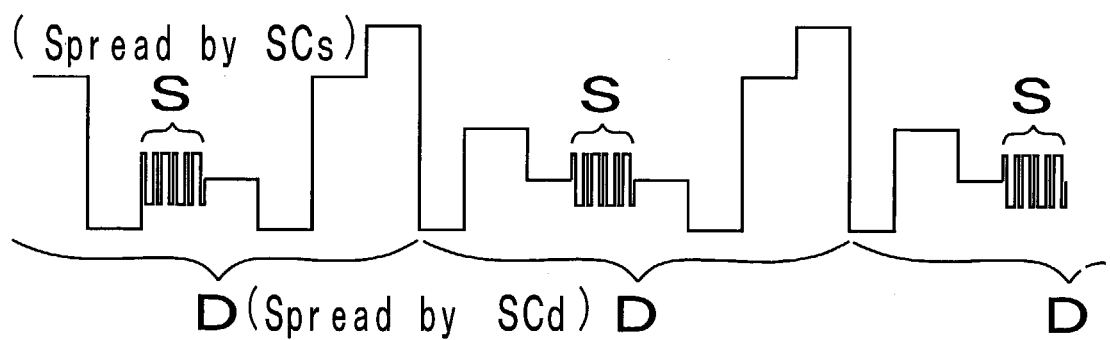

Fig. 3
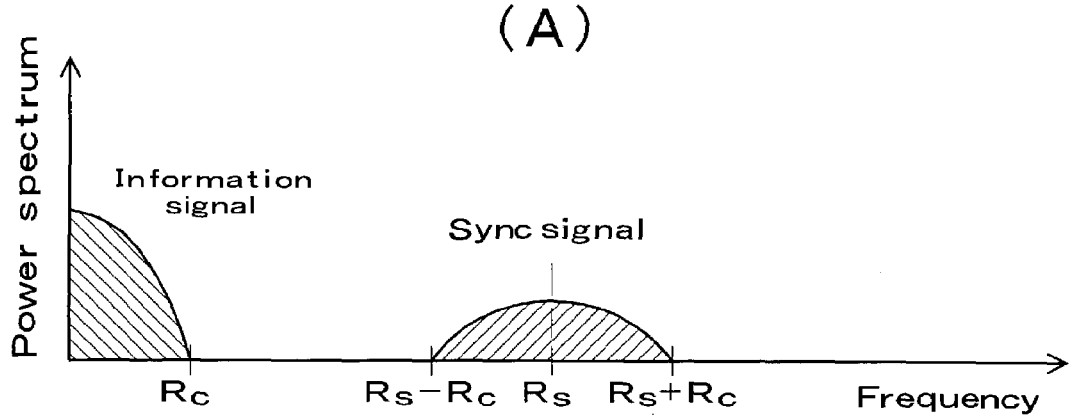
(A)
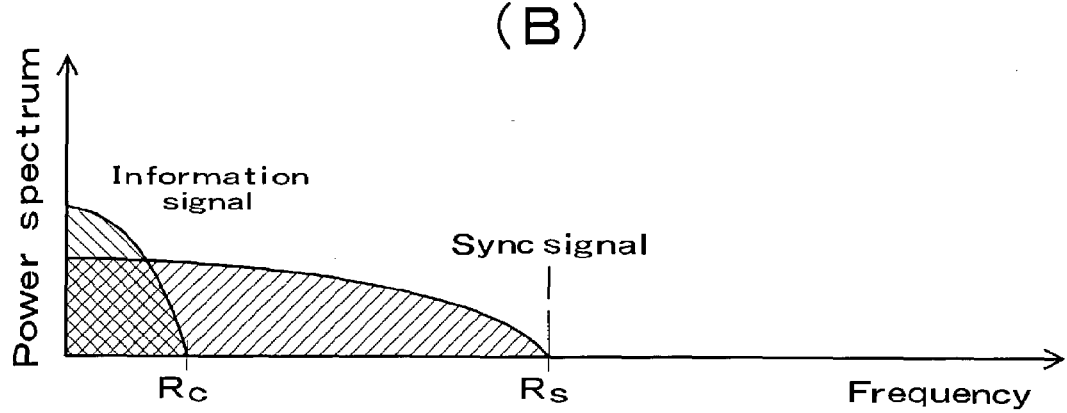
(B)
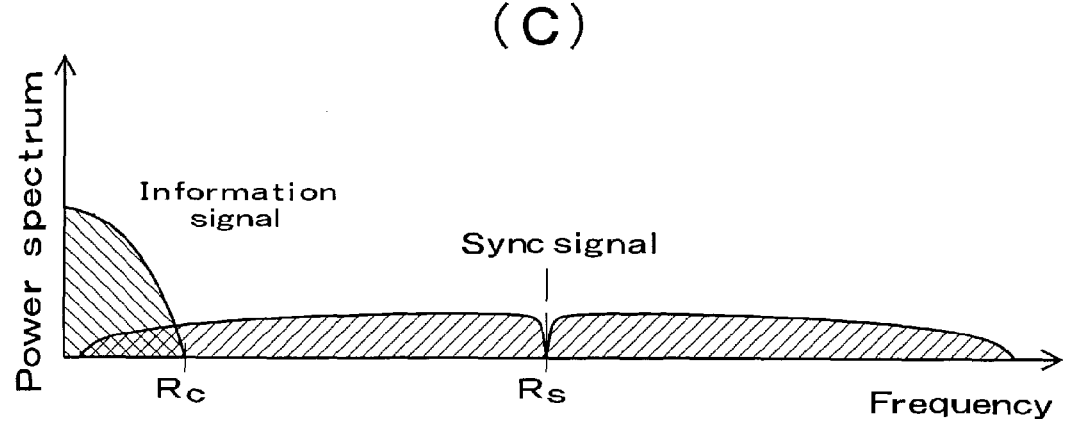
(C)

Fig. 7
(A)
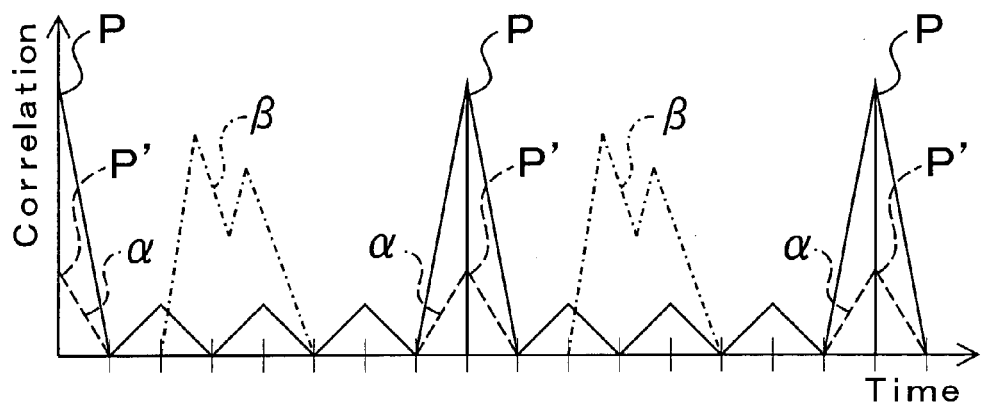
(B)
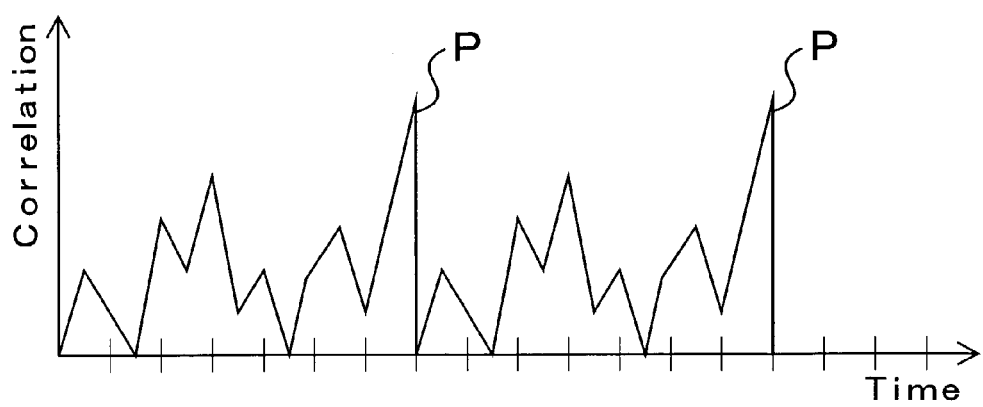

WIRED SPREAD SPECTRUM COMMUNICATION DEVICE, A METHOD FOR COMMUNICATION THEREOF, AND A WIRED SPREAD SPECTRUM COMMUNICATION SYSTEM

BACKGROUND OF THE INVENTION

1. Field of the Invention

The present invention relates to a wired spread spectrum communication device for communicating information signals that have been spread through spreading codes by means of transmission lines.

2. Description of the Prior Art

Conventional wired spread spectrum communication devices were arranged in that for the purpose of transmitting sync signals, sync bit strings comprised of, for instance, several tens of bits to several hundreds of bits were sent out in the form of so-called preamble signals prior to transmitting information signals of actual data. It was thus necessary to send such preamble signals each time synchronism was to be established with a counterpart side, which resulted in one cause of preventing improvements in transmission efficiency.

For solving such problems, the applicant (assignee) of the present invention has suggested "a wired spread spectrum communication device and a method for communication" as disclosed in Japanese Patent Unexamined Publication No. 2001-144653, wherein it is disclosed that the wired spread spectrum communication device is "a wired spread spectrum communication device for transmitting information signals by means of transmission lines, comprising a sync signal generator which generates sync signals that are synchronous with one of information signals, spreading codes for spreading information signals or spread spectrum signals after spread, and a transmitting means which sends out the sync signals to transmission lines together with spread spectrum signals".

However, upon further studies that have been made by the inventors of the present invention, it has been found that the above-described wired spread spectrum communication device still exhibits the following drawbacks.

(1) It has been found that fluctuations in load connected to transmission lines for transmitting information signals or mixing of exogenous noise affect also properties of transmission lines so that cases may occur in which sync signals cannot be exactly extracted from received signals.

More particularly, when utilizing power lines such as power transmission lines or interior wirings as transmission lines, impedance properties of transmission lines fluctuate depending on load conditions of a demander side who receives supply of power or depending on supply conditions of a supplier side who supplies power, wherein such fluctuations cause attenuations in correlation peaks P to peaks P' of waveform α as illustrated in FIG. 7(A). A drawback is accordingly presented in that establishment of synchronism becomes difficult.

Upon mixing of exogenous noise owing to electromagnetic waves or the like into transmission lines, peaks may appear at positions different from the original correlation peaks P that are shown as waveform β as illustrated in FIG. 7(A). Such peaks owing to exogenous noise also present the drawback that difficulties in establishing synchronism are found.

(2) When employing code division multiple access (hereinafter referred to as "CDMA") through spread spectrum multiplex method, peaks exist at time positions that differ from those of the original correlation peaks P. A drawback is presented in that establishment of synchronism becomes more difficult owing to fluctuations in load or mixing of exogenous noise as already discussed in (1) above.

The present invention has been made in view of the above drawbacks, and an object of this invention is to provide a wired spread spectrum communication device, a method for communication thereof, and a wired spread spectrum communication system with which it is possible to easily establish synchronism.

SUMMARY OF THE INVENTION

To achieve the foregoing object, according to the present invention, a wired spread spectrum communication device which sends information signals that have been spread by spreading codes to transmission paths, the wired spread spectrum communication device comprising a spread spectrum signal generating means which generates spread spectrum signals on the basis of specified spreading codes, a sync signal generating means which outputs the spread spectrum signals that have been generated by the spread spectrum signal generating means at specified timings as sync signals, a superposing means which superposes the sync signals that have been output from the sync signal generating means to the information signals, and a transmitting means which sends the information signals, which have been superposed with the sync signals by the superposing means, to the transmission paths.

In the invention, a spread spectrum signal generating means generates spread spectrum signals on the basis of specified spreading codes, a sync signal generating means outputs the spread spectrum signals as sync signals at specified timings, and a superposing means superposes the sync signals to information signals. Thereafter, a transmitting means sends out the information signals superposed with sync signals to transmission lines. Since the sync signals superposed to the information signals are spread spectrum signals that appear at specified timings, a receiving side of the information signals may obtain radical correlation peaks at specified timings upon obtaining correlations between the information signals and the specified spreading codes. Moreover, since the sync signals are spread spectrum signals that are based on specified spreading codes, they exhibit superior noise-resisting properties that are peculiar to spread spectrum and are further advantageous in that possibilities of erroneous synchronism are extremely low when compared to sync signals that are comprised of patterns of short repetition cycles such as 0101 . . . . It is accordingly possible to relatively easily secure establishment of synchronism even in the presence of fluctuations impedance properties of transmission lines or occurrence of mixing of exogenous noise into the transmission lines and also when employing CDMA. It thus exhibits the effect of easily establishing synchronism.

In accordance with the more preferred teaching of the present invention, the specified timings are arbitrary timings for superposing one or more sync signals within a single cycle of the spreading codes for spreading the information signals or one sync signal to a plurality of cycles.

In the invention, since the specified timings for outputting sync signals from the sync signal generating means are arbitrary timings for superposing one or more sync signals within one cycle of a spreading code for spreading information signals or one sync signal within a plurality of cycles, sync signals are intermittently superposed and output. With this arrangement, transmitting power may be reduced when compared to a case in which sync signal are successively output.

It is accordingly possible to exhibit the effect of contributing to saving energy in addition to the effect of enabling easy establishment of synchronism.

In accordance with the more preferred teaching of the present invention, the spread spectrum signals are square waves of the specified spreading codes or are generated by multiplying the specified spreading codes with sine wave signals.

In the invention, since the spread spectrum signals are generated by multiplying square waves of specified spreading codes or specified spreading codes with sine wave signals, signals after multiplication are modulated as if they underwent phase modulation when multiplied with sine wave signals. With this arrangement, sync signals cannot be extracted on a receiving side of the information signals unless both of frequency components of the sine wave signals and spreading codes coincide. It is accordingly possible to exhibit the effect of enabling more easier establishment of synchronism owing to improvements in noise-resisting properties when compared to a case in which only specified spreading codes are simply sent out as sync signals.

In order to accomplish the said object, according to the present invention, a wired spread spectrum communication device which receives received signals including information signals that have been spread by spreading codes from transmission paths, the wired spread spectrum communication device comprising a correlator means which obtains correlations between the received signals that have been received from the transmission paths and specified spreading codes owned by sync signals that have been superposed to the received signals and extracting the sync signals, a back-spreading code generating means which generates back-spread spectrum signals that are capable of demodulating information signals on the basis of the sync signals that have been extracted by the correlator means, and a demodulator means which performs back-spread of the received signals on the basis of the back-spread spectrum signal codes as generated by the back-spreading code generating means and which demodulates the information signals.

In the invention, a correlation means extracts sync signals upon obtaining correlations between received signals that have been received and the specified spreading codes that are owned by sync signals that are superposed onto the received signals, a back-spreading code generating means generates back-spreading codes that may demodulate information signals on the basis of the sync signals, and a demodulating means performs back-spread of received signals on the basis of the back-spreading codes for demodulating the information signals. With this arrangement, it is possible to obtain radical correlation peaks at specified timings upon obtaining correlations between the received signals and the specified spreading codes. Moreover, since the sync signals are spread spectrum signals that are based on specified spreading codes, they exhibit superior noise-resisting properties that are peculiar to spread spectrum and are further advantageous in that possibilities of erroneous synchronism are extremely low when compared to sync signals that are comprised of patterns of short repetition cycles such as 0101 . . . . It is accordingly possible to relatively easily secure establishment of synchronism even in the presence of fluctuations impedance properties of transmission lines or occurrence of mixing of exogenous noise into the transmission lines and also when employing CDMA. It thus exhibits the effect of easily establishing synchronism.

In order to accomplish the said object, according to the present invention, a wired spread spectrum communication method in which information signals that have been spread by spreading codes are transmitted through transmission paths, the wired spread spectrum communication method including the steps of outputting spread spectrum signals that have been generated on the basis of specified spreading codes at specified timings as sync signals, superposing the sync signals to the information signals and transmitting them out to the transmission paths.

In the invention, spread spectrum signals that have been generated on the basis of specified spreading codes are output as sync signals at specified timings, and the sync signals are superposed to information signals for transmitting them out to transmission lines. With this arrangement, since the sync signals superposed to the information signals are spread spectrum signals that appear at specified timings, a receiving side of the information signals may obtain radical peaks at specified timings upon obtaining correlations between the information signals and the specified spreading codes. Moreover, since the sync signals are spread spectrum signals that are based on specified spreading codes, they exhibit superior noise-resisting properties that are peculiar to spread spectrum and are further advantageous in that possibilities of erroneous synchronism are extremely low when compared to sync signals that are comprised of patterns of short repetition cycles such as 0101 . . . . It is accordingly possible to relatively easily secure establishment of synchronism even in the presence of fluctuations impedance properties of transmission lines or occurrence of mixing of exogenous noise into the transmission lines and also when employing CDMA. It thus exhibits the effect of easily establishing synchronism.

In accordance with the more preferred teaching of the present invention, the specified timings are arbitrary timings for superposing one or more sync signals within a single cycle of the spreading codes for spreading the information signals or one sync signal to a plurality of cycles.

In the invention, since the specified timings are arbitrary timings for superposing one or more sync signals within one cycle of a spreading code for spreading information signals or one sync signal within a plurality of cycles, sync signals are intermittently superposed and output. With this arrangement, transmitting power may be reduced when compared to a case in which sync signal are successively output. It is accordingly possible to exhibit the effect of contributing to saving energy in addition to the effect of enabling easy establishment of synchronism.

In accordance with the more preferred teaching of the present invention, the spread spectrum signals are square waves of the specified spreading codes or are generated by multiplying the specified spreading codes with sine wave signals.

In the invention, since the spread spectrum signals are generated by multiplying specified spreading codes with sine wave signals, signals after multiplication are modulated as if they underwent phase modulation when multiplied by sine wave signals. With this arrangement, sync signals cannot be extracted on a receiving side of the information signals unless both of frequency components of the sine wave signals and spreading codes coincide. It is accordingly possible to exhibit the effect of enabling easier establishment of synchronism owing to improvements in noise-resisting properties when compared to a case in which only specified spreading codes are simply sent out as sync signals.

In order to accomplish the said object, according to the present invention, a wired spread spectrum communication method in which received signals including information signals that have been spread by spreading codes are received from transmission paths, the wired spread spectrum communication method including the steps of generating, on the basis of sync signals extracted by obtaining correlations between the received signals that have been received from the transmission paths and specified spreading codes owned by sync signals that have been superposed to the received signals, back-spread spectrum signals that are capable of demodulating information signals, and performing back-spread of the received signals on the basis of the back-spread spectrum signal codes for demodulating the information signals.

In the invention, back-spreading codes that may demodulate information signals are generated on the basis of the sync signals by obtaining correlations between received signals that have been received from transmission lines and specified spreading codes owned by sync signals superposed to the received signals, and back-spread of received signals is performed on the basis of the back-spreading codes for demodulating the information signals. With this arrangement, it is possible to obtain radical correlation peaks at specified timing upon obtaining correlation between the received signals and the specified spreading codes. Moreover, since the sync signals are spread spectrum signals that are based on specified spreading codes, they exhibit superior noise-resisting properties that are peculiar to spread spectrum and are further advantageous in that possibilities of erroneous synchronism are extremely low when compared to sync signals that are comprised of patterns of short repetition cycles such as 0101 .... It is accordingly possible to relatively easily secure establishment of synchronism even in the presence of fluctuations impedance properties of transmission lines or occurrence of mixing of exogenous noise into the transmission lines and also when employing CDMA. It thus exhibits the effect of easily establishing synchronism.

In order to accomplish the said object, according to the present invention, a wired spread spectrum communication system which communicates information signals that have been spread by spreading codes to transmission paths, the wired spread spectrum communication system comprising a transmitting device which outputs spread spectrum signals generated on the basis of specified spreading codes at specified timings as sync signals and which superposes the sync signals to the information signals for transmitting them out to the transmission paths, and a receiving device which generates, on the basis of sync signals extracted by obtaining correlations between the received signals that have been received from the transmission paths and specified spreading codes owned by sync signals that have been superposed to the received signals, back-spread spectrum signals that are capable of demodulating information signals, and which performs back-spread of the received signals on the basis of the back-spread spectrum signal for demodulating the information signals.

In the invention, a transmitting device outputs spread spectrum signals that have been generated on the basis of specified spreading codes as sync signals at specified timings and the sync signals are superposed to the information signals prior to transmitting them out to transmission lines, and a receiving device generates back-spreading codes that may demodulate information signals on the basis of sync signals extracted upon obtaining correlations between information signals that have been sent out from the transmitting device and specified spreading codes owned by the sync signals, and performs back-spread of received signals on the basis of the back-spreading codes for demodulating the information signals. With this arrangement, since sync signals are superposed to information signals that are sent from the transmitting device and since these sync signals are spread spectrum signals that appear at specified timings, it is possible to obtain radical correlation peaks at specified timings upon obtaining correlations between the received signals and the specified spreading codes. Moreover, since the sync signals are spread spectrum signals that are based on specified spreading codes, they exhibit superior noise-resisting properties that are peculiar to spread spectrum and are further advantageous in that possibilities of erroneous synchronism are extremely low when compared to sync signals that are comprised of patterns of short repetition cycles such as 0101 .... It is accordingly possible to relatively easily secure establishment of synchronism even in the presence of fluctuations impedance properties of transmission lines or occurrence of mixing of exogenous noise into the transmission lines and even when employing CDMA. It thus exhibits the effect of enabling construction of a wired spread spectrum communication system that is capable of easily establishing synchronism.

BRIEF DESCRIPTION OF THE DRAWINGS

FIG. 1 is an explanatory view for clarifying features of the wired spread spectrum communication device according to one embodiment, wherein FIG. 1(A) illustrates an example of sync signals S that are superposed to information signals D and an example of correlation properties, and FIG. 1(B) is an explanatory view illustrating transmitting signals of the wired spread spectrum communication device.

FIG. 3 is an explanatory view illustrating frequency distribution of power spectra of transmitting signals, wherein FIG. 3(A) illustrates a frequency spectrum in which the sync spread spectrum signals are analog signals, FIG. 3(B) illustrates a frequency spectrum in which the sync spread spectrum signals are digital signals and FIG. 3(C) illustrates a frequency spectrum in which the sync spread spectrum signals are analog signals.

FIG. 7 is an explanatory view illustrating an example of correlation properties, wherein FIG. 7(A) illustrates one of spread spectrum communication and FIG. 7(B) illustrates one of CDMA, respectively.

DESCRIPTION OF THE PREFERRED EMBODIMENTS

Figure 2:
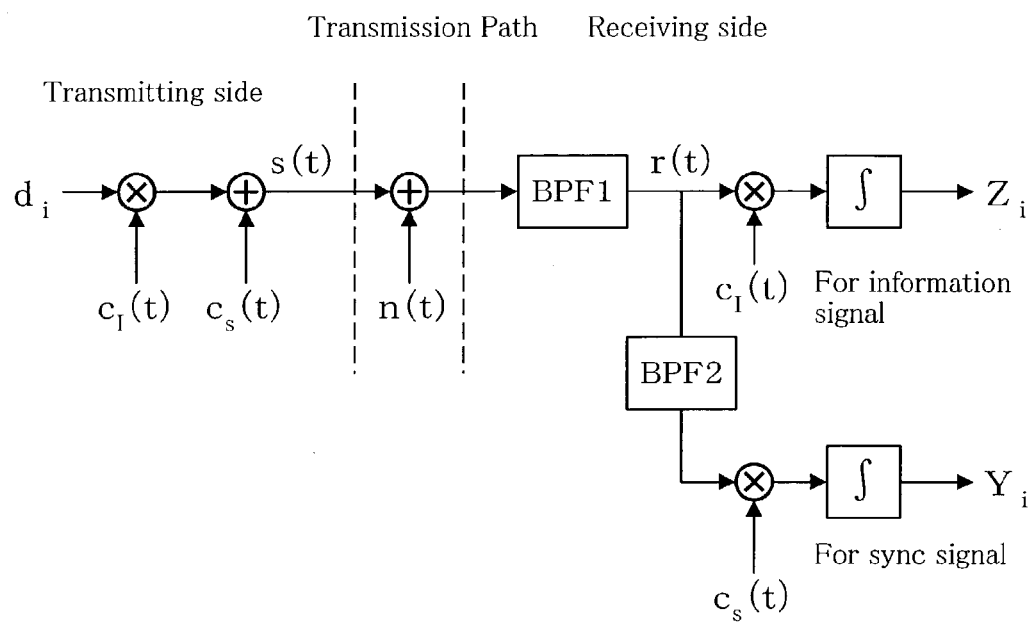
FIG. 2 is an explanatory view illustrating an arrangement of a basic model of the wired spread spectrum communication device according to the above embodiment.

Embodiments of the wired spread spectrum communication device according to the present invention will now be explained with reference to the drawings. For clarifying features of the wired spread spectrum communication device according to the present embodiment, the concept and basic model of such a wired spread spectrum communication device will first be explained on the basis of FIGS. 1 to 3.

The present wired spread spectrum communication device is characterized in that spread spectrum signals that are based on specified spreading codes are superposed to information signals as sync signal at specified timings to be then sent to transmission lines. For instance, sync signals S spread by spreading codes SCs are superposed to information signals D spread by spreading codes SCd as illustrated in FIG. 1(A). With this arrangement, transmitting signals as illustrated in FIG. 1(B) are sent to transmission lines. It should be noted that while each sync signals S superposes to a last (seventh) chip block of a single frame (which is arranged of seven chips) of the spreading code SCd for spreading information signals D in the present embodiment as illustrated in FIG. 1(A), the timing of superposition is arbitrary unless one or more sync signals S are superposed within a single cycle of the spreading code SCd. Spreading code SCs and spreading code SCd are mutually different codes.

By superposing sync signals S as spread by spreading code SCs in the above-described manner, the sync signals S superposed to the information signals D will be the spreading codes SCs that appear at specified timings, and a receiving side of the information signals D may obtain a radical correlation peaks P at specified timings as illustrated in FIG. 1(A) upon obtaining correlations between the information signals D and the specified spreading code SCs. Moreover, the sync signals S are spread spectrum signals that are based on the specified spreading code SCs. Accordingly, they exhibit superior noise-resisting properties that are peculiar to spread spectrum and are further advantageous in that possibilities of erroneous synchronism are extremely low when compared to sync signals that are comprised of patterns of short repetition cycles such as 0101 . . . .

It should be noted that even when the spreading code SCs and the spreading codes SCd are defined to be identical codes, it is still possible to make them effectively act since these codes maybe separated by their frequencies. Also when performing base band transmission without undergoing modulation through base fields or carrier waves, superposing the sync signals S that have been spread by the spreading code SCs in the above-descried manner will prevent sync signals S from being inserted between information signals D, and it is possible to easily establish synchronism without sacrificing transmission rates. Moreover, since the spreading codes SCs are not modulated by the information signals D and superposing is performed in a short period of time at specified timings, it is possible to make them less vulnerable to fluctuations in impedance properties of transmission lines also when employing power lines such as power transmission lines or indoor wirings as transmission lines.

A basic model of the wired spread spectrum communication device according to the present embodiment will now be explained with reference to FIG. 2. It should be noted that FIG. 2 schematically illustrates a transmitting side of the wired spread spectrum communication device, a transmission line, and a receiving side of the same device, respectively.

As illustrated in FIG. 2, an input information signal $d_i$ (information signal D) is multiplied with an information spread spectrum signal $c_I(t)$ (spreading code SCd), that is, the information signal $d_i$ is spread by the information spread spectrum signal $c_I(t)$ on the transmitting side of the wired spread spectrum communication device.

Here, the information spread spectrum signal $c_I(t)$ is defined by the following equation (1), that is, a function of $P_T(t)$ which is a sum of a single cycle from j=0 to ($N_C$−1). In the equation (1), $T_C$ represents a chip width of an information spreading sequence (spreading code SCd) while $N_C$ represents a length of the information spreading sequence (spreading code SCd), respectively. Further, g is given by the following equation (2) and represents an information spreading code sequence comprised of −1 and 1 (spreading code SCd). $P_T(t)$ is a function representing an arbitrary pulse waveform of time width T.

[Formula 1]

$$c_I(t) = \sum_{j=0}^{N_c-1} g_j P_{T_c}(t - jT_c) \qquad g_j \in \{-1, 1\} \qquad (1)$$

$$g = \{g_0, g_1, g_2, \ldots, g_{N_c-1}\} \qquad (2)$$

When the input information signal $d_i$ is spread by the information spread spectrum signal $c_I(t)$, a sync spread spectrum signal $c_S(t)$ (spreading code SCs) is added to the information signal that is spread next, that is, the sync spread spectrum signal $c_S(t)$ is superposed to the spread information signal.

Here, the sync spread spectrum signal $c_S(t)$ is defined by the following equation (3). Similar to the information spread spectrum signal $c_I(t)$, the sync spread spectrum signal $c_S(t)$ is defined by a function of $P_T(t)$ which is a sum of a single cycle from k=0 to ($N_S$−1). In the equation (3), Ts represents a chip width of a sync spreading sequence (spreading code SCs) while $N_S$ represents a length of the sync spreading sequence (spreading code SCs), respectively. Further, h is given by the following equation (4) and represents a sync spreading sequence comprised of −1 and 1 (spreading code SCs).

[Formula 2]

$$c_S(t) = \sum_{k=0}^{N_s-1} h_k P_{T_s}(t - kTs) \qquad h_k \in \{-1, 1\} \qquad (3)$$

$$h = \{h_0, h_1, h_2, \ldots, h_{N_s-1}\} \qquad (4)$$

$$M = T_C/T_S \qquad (5)$$

Here, a ratio M of the tip width $T_C$ of the information spreading sequence to the tip width $T_S$ of the sync spreading sequence is given by the above equation (5) and represents a number of chips of the sync spreading sequence that is included in a single chip cycle of the information spreading sequence.

With this arrangement, a transmitting signal s(t) superposed with the sync spread spectrum signal $c_S(t)$ may be represented by the following equation (6). Here, $P_I$ and $P_S$ represent power of the information signal and the sync signal, respectively, and T represents a cycle of the information signal, wherein a relationship of $T = N_C \cdot T_C$ holds. δ is an integer and is a coefficient for representing delays in an arbitrary number of chips.

[Formula 3]

$$s(t) = \sum_{j=-\infty}^{\infty} \left\{ \sqrt{P_I}\, d_i c_I(t - iT) + \sqrt{P_s}\, c_s(t - iT - \delta T_c) \right\} \qquad (6)$$
$$d_i \in \{-1, 1\}$$

It can be understood from the above equations (5) and (6) that an occupied bandwidth of the sync signal in the second term of equation (6) will be M-times of an occupied bandwidth of the information signal in the first term of equation (6).

Since noise components will be mixed to the transmitting signal, which is the information signal D superposed with the sync signal S, in the transmission line on the transmitting side, n (t) is added in the course of the transmission line as illustrated in FIG. 2.

On the receiving side of the wired spread spectrum communication device, a received signal r(t) that has been received through a band pass filter (BPF) 1 is multiplied by the information spread spectrum signal $c_I(t)$ (spreading code SCd) and the sync spread spectrum signal $c_S(t)$ (spreading code SCs), that is, undergoes back-spread, and information signal $Z_i$ and sync signal $Y_i$ are respectively demodulated. It should be noted that a BPF 2 capable of extracting sync signals S is provided upstream of multiplying with the sync spread spectrum signal $c_S(t)$.

Here, received signal r(t) is given by the following equation (7). n(t) is a white Gaussin noise (bilateral power spectral density $N_0/2$)

[Formula 4]

$$r(t) = s(t) + n(t) \quad (7)$$

$$= \sum_{j=-\infty}^{\infty} \left\{ \sqrt{P_I} d_i c_I(t - iT) + \sqrt{P_s} c_s(t - iT - \delta T_c) \right\} + n(t)$$

Here, one example will be explained in which the following two conditions are given.

First condition: the length $N_s$ of the sync spreading sequence is defined to be M. In other words, it is assumed that the sync spreading sequence is superposed to only a single chip block of the information spreading sequence.

Second condition: At a point of starting the sync spreading sequence, it is in sync with a point of starting an arbitrary chip of the information spreading sequence.

With this assumption, a correlator output $Z_i$ when a correlation is obtained with the information spreading sequence is given by the following equation (8). In this equation (8) integration of information data corresponding to a single cycle (from 0 to T) is performed.

[Formula 5]

$$Z_i = \int_0^T r(t)c_I(t - iT)dt \quad (8)$$

$$= \sqrt{P_I} d_i \int_0^T c_I(t - iT)c_I(t - iT)dt +$$

$$\sqrt{P_s} \int_0^T c_s(t - iT - \delta T_c)c_I(t - iT)dt +$$

$$\int_0^T n(t)c_I(t - iT)dt$$

$$= \sqrt{P_I} d_i T + \sqrt{P_s} \int_0^T c_s(t - \delta T_c)c_I(t)dt + N_0 T$$

The first term of this equation (8) represents sent information data, the second term represents an interference term between the information spread spectrum signal and the sync spread spectrum signal, and the third term represent noise. At this time, when the first and second conditions are met and a third condition "the numbers of +1 and −1 of the sync spreading sequence h that is given by the above equation (4) are equal" is further met, the second term of the equation (8) will become 0 (zero). In other words, no interference of the sync spread spectrum signal to the information data will take place.

On the other hand, a correlator output $Y_i$ when a correlation with the sync spreading sequence is obtained is given by the following equation (9). In this equation (9), integration of sync signals corresponding to a single cycle (from δ to δ+1) is performed.

[Formula 6]

$$Y_i = \int_{\delta T_c}^{(\delta+1)T_c} r(t - \tau)c_s(t)dt \quad (9)$$

$$= \sqrt{P_s} \int_{\delta T_c}^{(\delta+1)T_c} c_s(t - \delta T_c - \tau)c_s(t)dt +$$

$$\sqrt{P_I} \int_{\delta T_c}^{(\delta+1)T_c} d_i c_I(t - iT - \tau)c_s(t)dt +$$

$$\int_{\delta T_c}^{(\delta+1)T_c} n(t)c_s(t)dt$$

$$= \sqrt{P_s} \int_0^T c_s(t - \tau)c_s(t)dt +$$

$$\sqrt{P_I} \int_{\delta T_c}^{(\delta+1)T_c} d_i c_I(t - iT - \tau)c_s(t)dt + N_0 T_c$$

The first term of this equation (9) represents a term of correlation output between sync signals, the second term represents an interference term between the sync spread spectrum signal and the information spread spectrum signal, and the third term represents noise. All of $d_i$, $c_I(t)$ and $c_S(t)$ assume the value of either +1 or −1, so that the interference component $I_i$ of the second term will be given by the following equation (10) when all of the above first, second and third conditions are met, and a correlation output D of the sync signal of the first term will be given by the following equation (11).

[Equation 7]

$$\left. \begin{array}{ll} I_i = 0 & \tau = 0 \\ I_i < \sqrt{P_I}\, T_c & \tau \neq 0 \end{array} \right\} \quad (10)$$

$$\left. \begin{array}{ll} D = \sqrt{P_s}\, T_c & \tau = 0 \\ D < \sqrt{P_s}\, T_c & \tau \neq 0 \end{array} \right\} \quad (11)$$

However, since a spreading sequence with which the correlation at points other than sync points (τ≠0) becomes low is ordinarily selected as for the sync spreading sequence, the output of the first term in the above equation (9) when τ≠0 is satisfied becomes extremely low. Here, the energy $E_b$ per one bit cycle of the information signal (one frame of the information signal) and the energy $E_S$ per one cycle of the sync signal may be given by the following equations (12) and (13).

[Formula 8]

$$E_b = P_I T = P_I N_C T_C \quad (12)$$

$$E_S = P_S T_C \quad (13)$$

On the basis of equation (10), interference power from the information signal of the correlation output with the sync spreading sequence is given by the following equation (14), and on the basis of equation (11), the power of the correlation output between the sync spreading sequence and the sync signal is given by the following equation (15).

[Formula 9]

$$I_i^2 < P_I T_C^2 = (E_b/N_C)T_C \quad (14)$$

$$D^2 < P_S T_C^2 = E_S T_C \quad (15)$$

It can be therefore understood that the amount by which information signal affects the correlation output with the sync spreading sequence is as small as $1/N_C$ of the energy per one bit of information signal.

Radical correlation peaks can be obtained at specified timings upon superposing spread spectrum signals that are based on specified spreading codes on information signals as sync signals at specified timings, by transmitting them out to transmission lines on the transmitting side, and upon obtaining correlations between the information signals and the specified spreading codes on the receiving side. Thus, establishment of synchronism can be relatively easily secured even in the presence of fluctuations in impedance properties of transmission lines or occurrence of mixing of exogenous noise into the transmission lines and also when employing CDMA. Since the sync signals are spread spectrum signals that are based on specified spreading codes, they exhibit superior noise-resisting properties that are peculiar to spread spectrum and are further advantageous in that possibilities of erroneous synchronism are extremely low when compared to sync signals that are comprised of patterns of short repetition cycles such as 0101 . . . . It can be understood from the above that the wired spread spectrum communication device according to the present embodiment exhibits the effect of enabling easy establishment of synchronism.

It should be noted that while digital signals of –1 and 1 have been employed as the above-described sync spreading codes $c_S(t)$, it is also possible to employ analog signals such as sine waves. In this case, when giving P(t) to the above-described equation (3) through the following equation (21), the following equation (22) will be a sync spreading sequence. Here, $f_S$, $R_S$ represent central frequencies of sync signals.

[Equation 10]

$$P_{Ts} = \sqrt{2} \, \text{Sin} \, \{(2\pi/T_S)t\} (0 \leq t < T_S)$$

$$P_{Ts} = 0$$

$$T_S = 1/f_S = (=1/R_S) \quad (21)$$

$$h = \{h_0, h_1, h_2, \ldots, h_{Ns-1}\} \quad (22)$$

Upon employing analog signals as the sync spread spectrum signals in this manner, the power spectrum of the transmitting signals can be made to substantially be of a frequency distribution as illustrated in FIG. 3(C). Thus, as illustrated in FIG. 3(B), the amount of overlap between information signal components and sync signal components (overlapping portions indicated by the hatchings) can be reduced when compared to a case in which the sync spread spectrum signals are digital signals (FIG. 3(C)).

More particularly, by employing analog signals as the sync spread spectrum signals, when the values of $h_0, h_1, h_2, \ldots$ as illustrated in the above equation (22) are all identical values (for instance, +1), the center of the frequency spectrum of the sync signals will move to frequency $R_S$ ($1/T_S$), and it will be possible to restrain overlaps with the frequency spectrum of the information signals (FIG. 3(A)). On the other hand, when the sync spread spectrum signals are digital signals, the overlapping bandwidth between the frequency spectrum of the information signals and the frequency spectrum of the sync spread spectrum signals will become broad (FIG. 3(B)). It will accordingly be difficult to avoid overlaps in the frequency spectrum of the information signals and the frequency spectrum of the sync signals.

Since phase modulation is performed by multiplying the sync spreading sequence with sine waves, the receiving side cannot extract sync signals unless both of the frequency components of the sine waves and the sync spreading sequence coincide. It will accordingly be possible to improve noise-resisting properties when compared to a case in which only sine wave signals are merely sent out as sync signals, leading to the effect of enabling easy establishment of synchronism.

Figure 4:
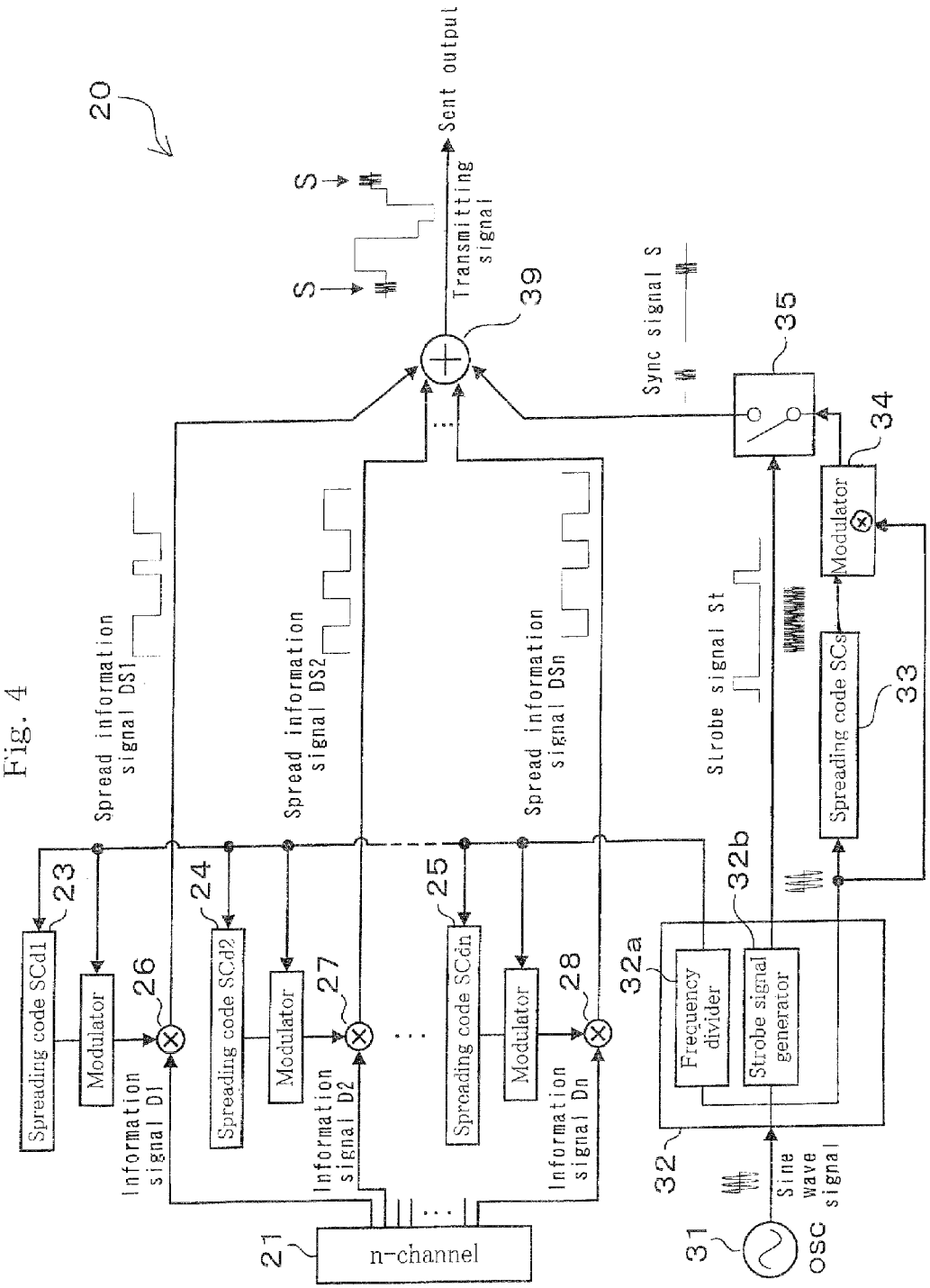
FIG. 4 is a block view illustrating a structure of a transmitter unit of the wired spread spectrum communication device according to one embodiment of the present invention.
Figure 5:
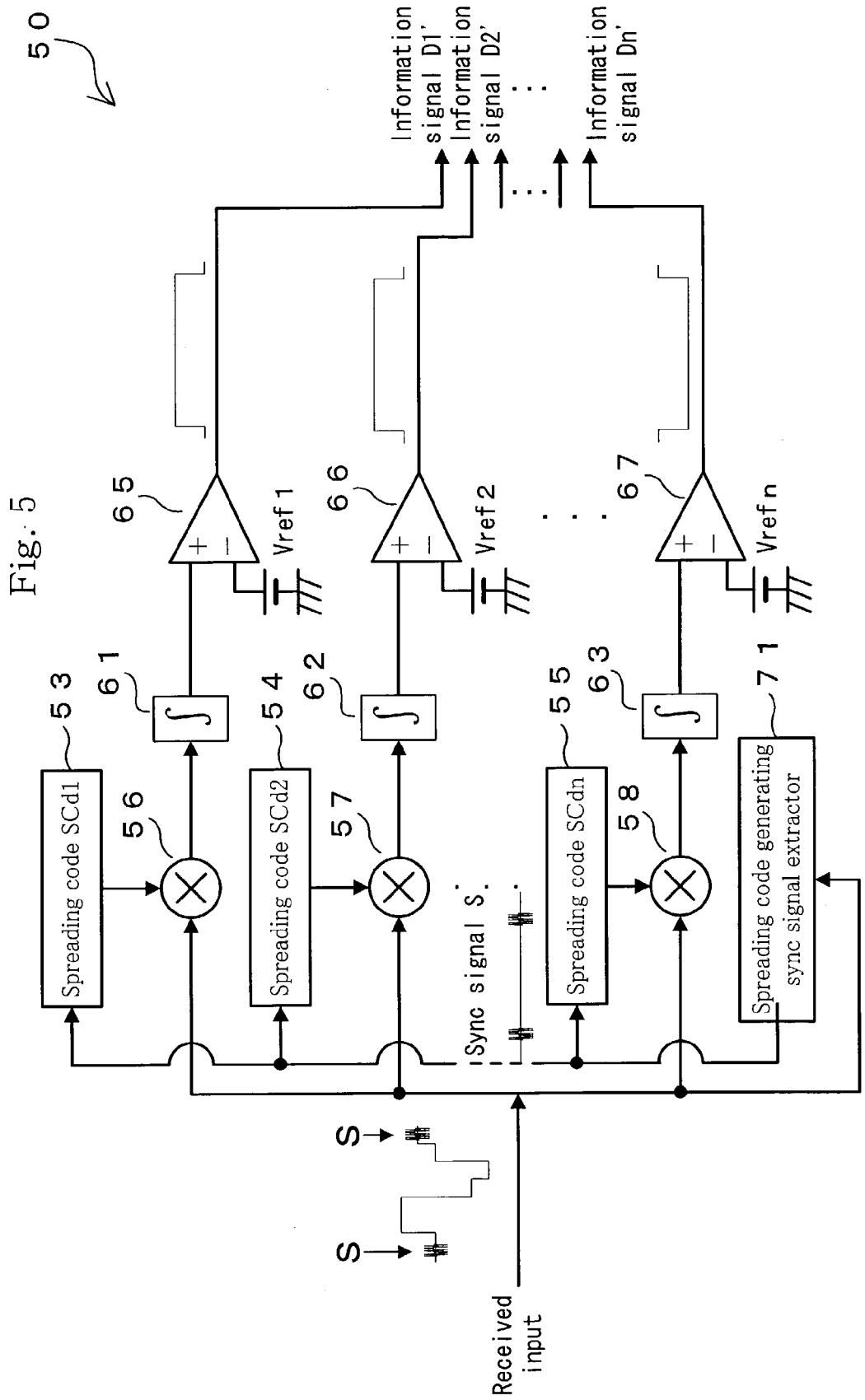
FIG. 5 is a block view illustrating a structure of a receiving unit of the wired spread spectrum communication device according to one embodiment of the present invention.

A transmitter unit 20 and a receiving unit 50 of a wired spread spectrum communication device in which the above-described basic model of the wired spread spectrum communication device has been given a concrete form will now be explained with reference to FIGS. 4 to 6.

The structure of the transmitter unit 20 of the wired spread spectrum communication device will be explained first. As illustrated in FIG. 4, the transmitter unit 20 is mainly comprised of a channel port 21, spreading code generators 23, 24, 25, multipliers 26, 27, 28, a signal generator 31, a timing generator 32, and an adder 39, and is provided with a function of multiplexing through CDMA information signals D1 to Dn of a plurality of channels (1, 2, . . . , n) that are input to the channel port 21 and of outputting them as transmitting signals to power lines that are used as transmission lines.

The channel port 21 is alike a terminal block that is provided for respectively allotting a plurality of information signals D1 to Dn to corresponding input ports of the channels for introducing them such that they may be multiplied with the respective spreading codes SC1 to SCn.

The spreading code generator 23 is provided with a function of generating a spreading code SCd1 for spreading an information signal D1 of channel 1, wherein the spreading code SCd1 is generated on the basis of a clock signal that is output from the timing generator 32 that is to be described later. Similarly, the spreading code generator 24 is provided with a function of generating a spreading code SCd2 for spreading an information signal D2 of channel 2, whereas the spreading code generator 25 generates a spreading code SCdn that corresponds to channel n. In other words, spreading code generators are provided by a number that corresponds to the number of the plurality of channels. With this arrangement, different spreading codes may be supplied to respective channels. It should be noted that these spreading codes SCd1 to SCdn are arranged to be of code strings that hardly interfere with each other.

The multiplier 26 is arranged to multiply the spreading code SCd1 as supplied from the spreading code generator 23 with the information signal D1 of channel 1 to be capable of generating a spread information signal DS1. More particularly, upon multiplication of the information signal D1 of channel 1 with the spreading code SCd1 that is supplied from the spreading code generator 23, spread spectrum is performed through the spreading code SCd1 whereupon the information signal D1 is converted into a spread information signal DS1. Similarly, the multiplier 27 multiplies the spreading code SCd2 as supplied from the spreading code generator 24 that corresponds to channel 2 with the information signal D2 of channel 2, and the multiplier 28 multiplies the spreading code SCdn as supplied from the spreading code generator 25 that corresponds to channel n with the information signal Dn of channel n to respectively generate spread information signals DS2 and DSn. With this arrangement, the information signals D1 to Dn of channels 1 to n undergo spread spectrum through respectively different spreading codes SCd1 to SCdn so that they may be separated into signals that hardly interfere with each other.

The signal generator 31 is provided with a function of outputting, for instance, sine wave signals, and is comprised of a crystal oscillator or a PLL oscillator of high stability. Since an output terminal of this signal generator 31 is connected to the timing generator 32, the output sine wave signals are input to the timing generator 32.

The timing generator 32 is comprised of a frequency divider 32a and a strobe signal generator 32b. The frequency divider 32a is provided with a function of frequency-dividing sine wave signals that have been input through the signal generator 31 by a specified integer n (1/n), and output terminals thereof are connected to respective spreading code generators 23, 24 and 25. With this arrangement, the respective spreading code generators 23, 24 and 25 generate spreading codes SC1 to SCn on the basis of being a clock that is output from the frequency divider 32a.

On the other hand, the strobe signal generator 32b is provide with a function of outputting strobe signals St on the basis of sine wave signals that have been input from the signal generator 31, and its output terminal is connected to a timing gate 35. The strobe signals St will become trigger signals for opening the gate upon input to the timing gate 35, and as to be described later, the strobe signal generator 32b is arranged to generate the strobe signals St at timings with which one or more sync signals S may be superposed within one cycle of the spreading codes SCd1 to SCdn. It should be noted that while the strobe signals St are set to be of timings permitting superposition of one sync signal S within one cycle of the spreading codes SCd1 to SCdn, it is alternatively possible to set the timings to superpose one sync signal S in a plurality of cycles (for instance, four to eight cycles).

The spreading code generator 33 is provided with a function of generating spreading codes SCs for spreading sync signals S, and is arranged to generate digital signals from the sine wave signals that are output from the signal generator 31 through the timing generator 32 and to generate spreading codes SCs on the basis of the digital signals. Since an output terminal of the spreading code generator 33 is connected to a downstream modulator 34, the generated spreading codes SCs are input to the modulator 34.

The modulator 34 is provided with a multiplying function and an output terminal thereof is connected to an input terminal of the timing gate 35. In the present embodiment, the sine wave signals that are output from the signal generator 31 through the timing generator 32 and the spreading codes SCs that are output from the spreading code generator 33 are multiplied. With this arrangement, the spreading codes SCs after multiplication will be modulated as if they underwent phase modulation, it is possible to improve noise-resisting properties when compared to a case in which only the spreading codes SCs are sent out as sync signals.

The timing gate 35 is provide with a function of controlling opening and closing of the gate through presence or absence of trigger input. As described above, the present embodiment is arranged in that strobe signals St that are output from the strobe signal generator 32b are input as trigger signals. Thus, when the strobe signals St are, for instance, of H level, the gate of the timing gate 35 is opened to communicate input and output of the timing gate, whereas when the strobe signals St are of L level, the gate of the timing gate 35 is closed for interrupting the input and output of the timing gate 35. With this arrangement, the spreading codes SCs after modulation that are output from the modulator 34 and that are input to the timing gate 35 will be output from the timing gate 35 to match the H level of the strobe signals St. That is, since the spreading codes SCs after modulation are output from the timing gate 35 at specified timings as sync signals S, sync signals S will be intermittently output from the timing gate 35 as illustrated in FIG. 4. Since the sync signals S are intermittently output from the timing gate 35 in this manner, superposition of the sync signals S by the adder 39 that will be described later will also be performed in an intermittent manner. With this arrangement, transmitting power may be reduced when compared to a case in which sync signals are successively output so that it is possible to contribute to saving energy as well.

The adder 39 is arranged to composite transmitting signals upon adding, that is, superposing the spread information signals DS1 to DSn of respective channels 1 to n with the sync signals S that are intermittently output from the timing gate 35. More particularly, upon adding all of the spread information signals DS1 to DSn that underwent spread spectrum through respective spreading codes SCd1 to SCdn, step-like signal waveforms with sync signals S being intermittently superposed are generated (FIG. 4), and these are output as transmitting output to power lines that serve as transmission lines (not shown). With this arrangement, transmitting signals superposed with sync signals S may be directly output to power lines that serve as transmission lines.

By arranging the transmitter unit 20 in the above manner, spread spectrum signals that are based on specified spreading codes SCs are generated by the spreading code generator 33, these spread spectrum signals output by the strobe signal generator 32b and the timing gate 35 as sync signals S at specified timings, and the sync signals S superposed to spread information signals DS1 to DSn (information signals D) by the adder 39. The adder 39 then sends the information signals DS1 to DSn superposed with sync signals S to the transmission lines as transmitting signals. With this arrangement, since the sync signals S superposed to the information signals DS1 to DSn are spread spectrum signals that appear at specified timings, it will be possible to obtain radical correlation peaks at specified timings upon obtaining correlations between the received signals and the specified spreading codes SCs on the receiving side of the information signals DS1 to DSn.

Since the sync signals S are spread spectrum signals that are based on specified spreading codes SCs, they exhibit superior noise-resisting properties that are peculiar to spread spectrum and are further advantageous in that possibilities of erroneous synchronism are extremely low when compared to sync signals that are comprised of patterns of short repetition cycles such as 0101 . . .

More particularly, in an arrangement of "a marking signal generator 31 that is arranged to be capable of generating sync signals that are generated at specified cycles (for instance, cycles that are in sync with frames of information signals), wherein the marking signals MK are expressed by, for instance, the presence or absence of specified sine wave signals" as suggested in the Japanese Patent Unexamined Publication No. 2001-144653 of the applicant of the present invention entitled "A wired spread spectrum communication device and a method of communication", the sync signals are comprised of a repetition pattern (0101 . . . ), which is "the presence and absence of sine wave signals", so that possibilities existed that synchronism occurred while mistaking a repetition pattern of, for instance, intensities of signals included in exogenous noise or similar as the proper sync signals. However, since sync signals S are generated on the basis of specified spreading codes SCs in the transmitter unit 20 of the present embodiment, such erroneous synchronism can be prevented, and it is possible to relatively easily secure establishment of synchronism even in the presence of fluctuations in impedance properties of transmission lines or occurrence of mixing of exogenous noise into the transmission lines and also when employing CDMA. It thus exhibits the effect of easily establishing synchronism.

The structure of the receiving unit 50 of the wired spread spectrum communication device will now be explained. As illustrated in FIG. 5, the receiving unit 50 is mainly comprised of spreading code generators 53, 54, 55, multipliers 56, 57, 58, integrators 61, 62, 63, comparators 65, 66, 67 and a spreading code generating sync signal extractor 71, and is provided with a function of demodulating information signals D1' to Dn' of respective channels after back-spread of received signals through received input from power lines serving as transmission lines and performing signal separation.

The structure of the spreading code generating sync signal extractor 71 will first be explained. The spreading code generating sync signal extractor 71 is a correlator provided with a function of obtaining correlations between received signals received from the transmission lines and specified spreading codes SCs that the sync signals S superposed to the received signals own and of enabling extraction of sync signals S, and maybe arranged as illustrated in FIG. 6.

Figure 6:
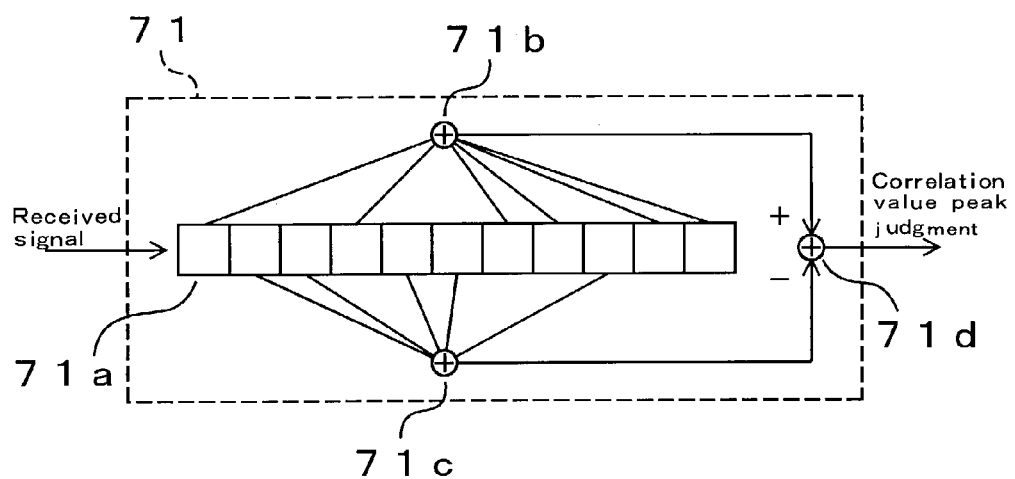
FIG. 6 is an explanatory view illustrating an example for arranging an spreading code generating sync signal extractor as illustrated in FIG. 5.

More particularly, the spreading code generating sync signal extractor 71 may be comprised, as illustrated in FIG. 6, of a SAW element such as a SAW convolver or a matched filter utilizing an operational amplifier or the like. According to a matched filter method, upon input of a received signal to a tapped delay line 71a that functions as a shift register, outputs of a tap 71b corresponding to "+1" and a tap 71c corresponding to "−1" are respectively added with its unit corresponding to one cycle of the spreading code SCs (for instance, 11 bits), and a difference between then is obtained by an adder 71d. For instance, the respective taps of the tapped delay line 71a as illustrated in FIG. 6 are set to be, for instance, "+1−1−1+1−1−1+1+1−1+1+1" to meet a code sequence of a targeted spreading code SCs. Thus, the tap 71b corresponding to "+1" is provided for the first, the fourth, the seventh, the eighth, the tenth and the eleventh bit when seen from the left in the drawing while the tap 71c corresponding to "−1" is provided for the second, the third, the fifth, the sixth and the ninth bit.

With this arrangement, upon input of a received signal to the tapped delay line 71a, a radical peak of one correlation value will necessarily be output to a correlation value output within a time corresponding to a single cycle of the targeted spreading code SCs. That is, since this peak as output from the adder 71d is a radical peak at specified timings that appears upon obtaining a correlation between the received signal and the specified spreading code SCs, this is set to be sync signal S and is input to the spreading code generators 53, 54 and 55.

Since the spreading code generator 53 performs back-spread of information signal D1 corresponding to channel 1, it is arranged to generate a spreading code SCd1 similar to the above-described spreading code generator 23, to meet the timing of sync signal S as extracted by the spreading code generating sync signal extractor 71. Due to the same reasons, the spreading code generator 54 generates a spreading code SCd2 corresponding to channel 2 and the spreading code generator 55 generates a spreading code SCdn corresponding to channel n. In other words, spreading code generators are provided by a number that corresponds to the number of the plurality of channels.

The multiplier 56 is arranged to multiply the spreading code SCd1 that is supplied from the spreading code generator 53 with the received signal and to generate a back-spread spectrum signal DDS1. In other words, since the spreading code SCd1 that is supplied from the spreading code generator 53 is of identical code strings as the spreading code SCd1 that is obtained upon spread spectrum of the information signal D1 of channel 1, multiplication of the spreading code SCd1 and the received signal will result in back-spread through the spreading code SCd1 such that the received signal is converted into back-spread spectrum signal DDS1. Similarly, the multiplier 57 multiplies the spreading code SCd2 that is supplied from the spreading code generator 54 corresponding to channel 2 with the received signal whereas the multiplier 58 multiplies the spreading code SCdn that is supplied from the spreading code generator 55 corresponding to channel n with the received signal so as to respectively generate back-spread spectrum signals DDS2 and DDSn. With this arrangement, the received signals are respectively separated into back-spread spectrum signals DDS1 to DDSn for respective channels.

The integrator 61 is arranged to be capable of integrating a back-spread spectrum signal DDS1 that has been, for instance, back-spread bit by bit with one bit of information signal being defined to be one cycle, wherein the integration is performed for one cycle of this bit block. With this arrangement, integrated values can be sequentially obtained per single bit of information signal from the back-spread spectrum signal DDS1, and upon combination with a comparator 65 that will be explained next, information signal D1' of channel 1 is demodulated in accordance with the integrated value. Similarly, the integrator 62 performs integration of the back-spread spectrum signal DDS2 that has been back-spread bit by bit of one bit of information signal corresponding to one cycle, and the integrator 63 performs integration of the back-spread spectrum signal DDSn that has been back-spread bit by bit of one bit of information signal corresponding to one cycle. Upon combination with the comparator 66 or the comparator 67, they similarly demodulate information signals D2' and Dn' of channel 2 or channel n, respectively. It should be noted that when diversifying a block of one bit of information signal into a plurality n and performing spread upon making the spreading code correspond to a plurality of n-times, integration is performed for the number of diversified blocks n, that is, for n-number of cycles, for the bit block by each bit of information signal. With this arrangement, code spread may be performed in a more diversified manner so that further improvements in noise-resisting properties, which are characteristics of spread spectrum communication, can be expected.

The comparator 65 is arranged to be capable of outputting H level or L level depending on whether an input voltage is larger than a reference voltage Vref1 or not. In other words, upon comparing, through the comparator 65, whether an integrated value of the integrator 61, which is an analog signal, is larger than a specified voltage or not, it is converted into a digital signal, which is either "1" or "0", that is, it is demodulated into information signal D1'. Similarly, the comparator 66 outputs H level or L level depending on whether an integrated value of integrator 62 is larger than reference voltage Vref2, and the comparator 67 outputs H level or L level depending on whether an integrated value of integrator 63 is larger than reference voltage Vrefn. It should be noted that respective reference voltages Vref1, Vref2 and Vrefn of comparators 65, 66 and 67 are set to 0V in the present embodiment. These comparators may alternatively be arranged to output either H level or L level upon comparing whether the input voltage is smaller than the reference voltage, that is, whether it is not more than a specified voltage.

With this arrangement of respectively demodulating information signals D1' to Dn' of the respective channels, information signals D1' to Dn' may be easily extracted from the back-spread spectrum signals DDS1 to DDSn by merely combining them with the above-described integrators 61, 62 and 63. Moreover, since demodulation of one bit can be performed on the basis of a volumetric relationship between integrated values obtained by the integrators 61, 62 and 63 and specified reference voltages, it is possible to perform demodulation even if all data within one cycle of a bit block are not present.

By arranging the receiving unit 50 in this manner, the spreading code generating sync signal extractor 71 extracts sync signals S upon obtaining correlations between received signals that have been received and specified spreading codes SCs that the sync signals S superposed to the received signals own, the spreading code generators 53, 54 and 55 generate back-spreading code SCd1, SCd2 and SCdn that are capable of demodulating information signals on the basis of the sync signals S, and the multipliers 56, 57 and 58 and the comparators 65, 66 and 67 perform back-spread of the received signals on the basis of the back-spread SCd1, SCd2 and SCdn. With this arrangement, it will be possible to obtain radical correlation peaks at specified timings upon obtaining correlations between received signals and the specified spreading codes SCs. Moreover, since the sync signals S are spread spectrum signals that are based on specified spreading codes SCs, they exhibit superior noise-resisting properties that are peculiar to spread spectrum and are further advantaged in that possibilities of erroneous synchronism are extremely low when compared to sync signals that are comprised of patterns of short repetition cycles such as 0101 . . . . It is accordingly possible to relatively easily secure establishment of synchronism even in the presence of fluctuations impedance properties of transmission lines or occurrence of mixing of exogenous noise into the transmission lines and also when employing CDMA. It thus exhibits the effect of easily establishing synchronism.

As explained so far, according to the wired spread spectrum communication device, spread spectrum signals generated on the basis of specified spreading codes SCs are output from the transmitter unit 20 as sync signals S at specified timings, whereupon the sync signals S are superposed to spread information signals DS1 to DSn (information signals D) to be sent to transmission lines as transmitting signals. The receiving unit 50 then generates back-spreading codes SCd1, SCd2 and SCdn that are capable of demodulating the information signals DS1 to DSn on the basis of sync signals S extracted by obtaining correlations between information signals DS1 to DSn that have been sent from the transmitter unit 20 and the specified spreading codes SCs owned by the sync signals S, whereupon the received signals are back-spread on the basis of the back-spread spectrum signals SCd1 SCd2 and SCdn for demodulating the information signals D1' to Dn'.

With this arrangement, since the sync signals S will be superposed to information signals that are sent out from the transmitter unit 20 and the sync signals S will be spread spectrum signals that appear at specified timings, the receiving unit 50 may obtain radical correlation peaks at specified timings upon obtaining correlations between the information signals and the specified spreading codes SCs. Since the sync signals are spread spectrum signals that are based on specified spreading codes SCs, they exhibit superior noise-resisting properties that are peculiar to spread spectrum and are further advantageous in that possibilities of erroneous synchronism are extremely low when compared to sync signals that are comprised of patterns of short repetition cycles such as 0101 . . . . It is accordingly possible to relatively easily secure establishment of synchronism even in the presence of fluctuations impedance properties of transmission lines or occurrence of mixing of exogenous noise into the transmission lines and also when employing CDMA. It thus exhibits the effect of enabling construction of a wired spread spectrum communication system that is capable of easily establishing synchronism.

Since the strobe signal generator 32b is arranged to such that specified timings for outputting sync signals S from the strobe signal generator 32b and the timing gate 35, that is, strobe signals St are generated at timings enabling superposition of one or more sync signals S within one cycle of the spreading codes SCd1 to SCdn or of one sync signal S to a plurality of cycles, sync signals are superposed and output in an intermittent manner. With this arrangement, transmitting power may be reduced when compared to a case in which sync signal are successively output. It is accordingly possible to exhibit the effect of contributing to saving energy in addition to the effect of enabling easy establishment of synchronism.

Since the spread spectrum signals are generated by multiplying, through modulator 34, specified spreading codes SCs and sine wave signals from signal generator 31, the signals after modulation (multiplication) will be modulated as if they underwent phase modulation. With this arrangement, the receiving side of the information signals, that is, the receiving unit 50, cannot extract sync signals S unless both of the frequency components of the sine waves and the sync spreading codes SCs coincide. It will accordingly be possible to improve noise-resisting properties when compared to a case in which only specified spreading codes SCs are merely sent out as sync signals S, leading to the effect of enabling easy establishment of synchronism.

It should be noted that while the transmitter unit as explained with reference to FIG. 4 has been arranged to multiply specified spreading codes SCs with sine wave signals and to perform phase modulation to the spread spectrum signals SCs after multiplication by the provision of modulator 34 downstream of the spreading code generator 33, it will be possible to superpose the specified spreading codes SCs in the condition of square waves without performing modulation of the specified spreading codes SCs through sine wave signals when employing an arrangement in which the modulator 34 is omitted. This arrangement enable to employing the specified spreading codes SCs of square waves as the spreading codes SCs.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A wired spread spectrum communication device comprises:
   a wired information signal port which introduces information signals consisting of base bands into wired channels,
   a sine wave signal generator which generates specified sine wave signals;
   an information spread spreading means comprising a spread code generating means and a modulator for each channel, which generates spread spectrum signals for spreading said information signals on the basis of specified spreading codes by multiplying said specified spreading codes,
   a sync signal generating means comprising a sync spread code generating means, a modulator and a timing gate, which intermittently outputs spread spectrum signals that have been generated by the sync spread code generating means and modulated by multiplying with said sine wave signals by said modulator, at specified timings controlled by said timing gate as sync signals, a superposing means which superposes the sync signals that have been output from the sync signal generating means to the spread information signals, and a transmitting means which sends the spread information signals, which have been superposed with the sync signals by the superposing means, to wired transmission paths.

2. The wired spread spectrum communication device as claimed in claim 1, wherein the specified timings are arbitrary timings for outputting one or more sync signal within a single cycle of a spreading code for spreading the information signals, or outputting one sync signal.

3. A wired spread spectrum communication method in which different information signals for each of at least two channels that have been spread by information spreading codes from a spread code generator are transmitted through transmission paths, the wired spread spectrum communication method including the steps of outputting spread spectrum signals for each channel that have been generated on the basis of specified spreading codes from a spread code generator for each channel modulated with a modulator for each channel by a sine wave signal from a sine wave signal generator along with sync signals intermittently output at specified timings controlled by a timing gate, superposing the sync signals to the different information signals that have been spread by said information spreading codes and transmitting them out to the transmission paths, wherein the sync signals are generated by multiplying with a multiplier the specified spreading codes with sine wave signals.

4. The wired spread spectrum communication method as claimed in claim 3, wherein the specified timings are arbitrary timings for outputting one or more sync signals within a single cycle of a spreading code for spreading the information signals, or one sync signal within a plurality of cycles of the spreading codes for spreading the information signals.

* * * * *